US011685281B2

(12) United States Patent
Grunkemeyer et al.

(10) Patent No.: US 11,685,281 B2
(45) Date of Patent: Jun. 27, 2023

(54) DEMAND FLEXIBILITY OPTIMIZING SCHEDULER FOR EV CHARGING AND CONTROLLING APPLIANCES

(71) Applicant: FlexCharging, Inc., Redmond, WA (US)

(72) Inventors: Brian Grunkemeyer, Redmond, WA (US); Laura McCarty, Redmond, WA (US)

(73) Assignee: FlexCharging, Inc., Redmond, WA (US)

( * ) Notice: Subject to any disclaimer, the term of this patent is extended or adjusted under 35 U.S.C. 154(b) by 319 days.

(21) Appl. No.: 17/094,739

(22) Filed: Nov. 10, 2020

(65) Prior Publication Data
US 2022/0144121 A1 May 12, 2022

(51) Int. Cl.
*B60L 53/64* (2019.01)
*B60L 53/62* (2019.01)
(Continued)

(52) U.S. Cl.
CPC .............. *B60L 53/64* (2019.02); *B60L 53/62* (2019.02); *B60L 53/63* (2019.02); *B60L 53/65* (2019.02);
(Continued)

(58) Field of Classification Search
CPC .......... B60L 53/64; B60L 53/62; B60L 53/63; B60L 53/65; B60L 53/67; B60L 53/68
See application file for complete search history.

(56) References Cited

U.S. PATENT DOCUMENTS

2011/0035073 A1* 2/2011 Ozog ............... H02J 13/00034
700/291
2013/0166081 A1 6/2013 Sanders et al.
(Continued)

*Primary Examiner* — David V Henze-Gongola
(74) *Attorney, Agent, or Firm* — Seed Intellectual Property Law Group LLP

(57) ABSTRACT

A system for integrating electric loads into the utility electric grid in a cost-effective, emissions-minimizing way. The system generates and implements a computer-readable series of instructions for one or more of starting and stopping electrical device charging or operation powering of an electrical device's duty cycle. The system includes a planning server including an optimization engine, one or more processors, and a memory device storing instructions thereon that when executed by the one or more processors, causes one or more of the one or more processors to: receive a charge request for charging an electrical device or operation powering of the electrical device's duty cycle, wherein the charge request includes time charge block sorting factors, generate a charging and powering schedule that includes multiple sets of disjointed time charge blocks to start and stop drawing power from a power grid to charge the electrical device or power the electrical device's duty cycle, calculate greenhouse gas emissions created during the scheduled time blocks, wherein each time charge block represents a block of time, a charge price, and a charge emissions value; and sort the time charge blocks in the charging and powering schedule using sorting factors that include price, emissions, solar availability, and combinations therein. Applied to a large number of devices, this system enables integration of devices like smart hot water heaters and electric vehicles into a utility's electric grid with reduced capacity need, avoiding capital expenses and lower operating expenses, while also minimizing carbon emissions and other air pollution.

43 Claims, 10 Drawing Sheets

Smart Charge App - In App Store

(51) Int. Cl.

| | |
|---|---|
| *B60L 53/63* | (2019.01) |
| *B60L 53/65* | (2019.01) |
| *B60L 53/67* | (2019.01) |
| *B60L 53/68* | (2019.01) |
| *G06N 3/08* | (2023.01) |
| *G06N 3/00* | (2023.01) |
| *G06N 3/04* | (2023.01) |
| *H04L 41/0893* | (2022.01) |
| *G06N 7/00* | (2023.01) |
| *G06N 20/00* | (2019.01) |
| *G06Q 50/06* | (2012.01) |
| *B60L 53/51* | (2019.01) |
| *G06Q 10/04* | (2023.01) |
| *G06N 3/088* | (2023.01) |
| *G06N 3/045* | (2023.01) |
| *G06N 7/01* | (2023.01) |

(52) U.S. Cl.
CPC ............... *B60L 53/67* (2019.02); *B60L 53/68* (2019.02); *G06N 3/00* (2013.01); *G06N 3/045* (2023.01); *G06N 3/08* (2013.01); *G06N 3/088* (2013.01); *G06N 7/01* (2023.01); *G06N 20/00* (2019.01); *H04L 41/0893* (2013.01); *B60L 53/51* (2019.02); *G06Q 10/04* (2013.01); *G06Q 50/06* (2013.01)

(56) References Cited

U.S. PATENT DOCUMENTS

| | | | |
|---|---|---|---|
| 2015/0057824 A1* | 2/2015 | Gheerardyn | G06Q 10/06 700/296 |
| 2019/0061535 A1 | 2/2019 | Bridges et al. | |
| 2019/0061548 A1 | 2/2019 | Lee et al. | |

* cited by examiner

Smart Charge App - In App Store

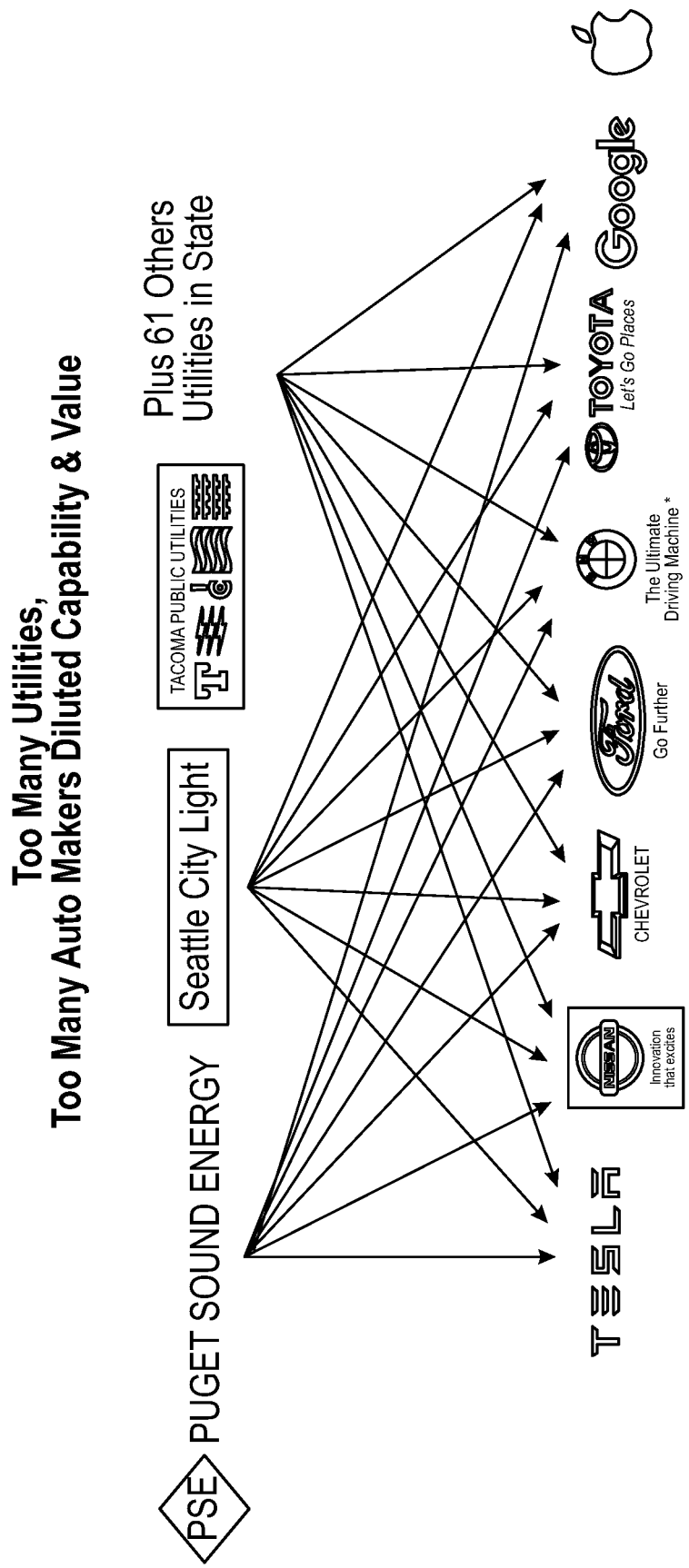

DEMAND FLEXIBILITY OPTIMIZING SCHEDULER FOR EV CHARGING AND CONTROLLING APPLIANCES

TECHNICAL FIELD

The present disclosure generally relates to scheduling and control systems and methods, and particularly, to scheduling and control systems and methods for EV and appliance charging as well as integration them an electric grid.

BACKGROUND

Description of the Related Art

Many electronic devices, utilize power but the timing of when the power is needed for charging and/or operation is often adaptable. These electronic devices with adaptable charging cycles include, by way of example only, and not by way of limitation: electric vehicles, electric water heaters, dishwashers, air conditioners, clothes washers, dryers, and energy storage devices. Their energy usage (either charging or their normal duty cycle) may be delayed to a more preferable time of the day based on current conditions of the power grid within reasonable bounds set by the operator. This optimal time of day can be determined by the price or environmental attributes of electricity usage at that hour, such as the CO2 emitted to produce the power. Additionally, residential and commercial batteries may be used to charge or discharge depending on the grid or microgrid needs, as well as the owner's economic interests. Some utilities have attempted several high-level approaches for controlling an electric load to minimize the peak capacity impacts.

There is a continuing need in the art for scheduling and control systems and methods for EV and appliance charging technology that minimize the electric load and peak capacity impacts. The present disclosure addresses these and other needs.

BRIEF SUMMARY

In some implementations, a system is disclosed for generating and implementing a computer-readable series of instructions for one or more of starting and stopping electrical device charging or operation powering of an electrical device's duty cycle. The system includes: a planning server including an optimization engine, one or more processors, and a memory device storing instructions thereon that when executed by the one or more processors, causes one or more of the one or more processors to: receive a charge request for charging an electrical device or operation powering of the electrical device's duty cycle, wherein the charge request includes time charge block sorting factors; generate a charging and powering schedule that includes multiple sets of disjointed time charge blocks to start and stop drawing power from a power grid to charge the electrical device or power the electrical device's duty cycle, wherein the generated time charge blocks represent when the electrical device is available for operating or load shifting, and wherein the charge request for the electrical device has a leave time or a device-needed time; specify a power level for the electrical device; calculate a cost of electricity drawn during the scheduled time blocks; calculate greenhouse gas emissions created during the scheduled time blocks, wherein each time charge block represents a block of time, a charge price, and a charge emissions value; sorting the time charge blocks in the charging and powering schedule using sorting factors that include price, emissions, solar availability, and combinations therein; and implementing the charging and powering schedule for the electrical device using factors that include price, emissions, solar, or combinations thereof.

In other implementations, a method is disclosed for of generating and implementing a computer-readable series of instructions for one or more of starting and stopping electrical device charging or operation powering of an electrical device's duty cycle. The method includes: receiving a charge request for charging an electrical device or operation powering of the electrical device's duty cycle, wherein the charge request includes time charge block sorting factors; generating a charging and powering schedule that includes multiple sets of disjointed time charge blocks to start and stop drawing power from a power grid to charge the electrical device or power the electrical device's duty cycle, wherein the generated time charge blocks represent when the electrical device is available for operating or load shifting, and wherein the charge request for the electrical device has a leave time or a device-needed time; specifying a power level for the electrical device; calculating a cost of electricity drawn during the scheduled time blocks; calculating greenhouse gas emissions created during the scheduled time blocks, wherein each time charge block represents a block of time, a charge price, and a charge emissions value; sorting the time charge blocks in the charging and powering schedule using sorting factors that include price, emissions, solar availability, and combinations therein; and implementing the charging and powering schedule for the electrical device using factors that include price, emissions, solar, or combinations thereof.

In still other implementations, a system is disclosed for generating and implementing an electrical device charging schedule. The system includes: a planning server including an optimization engine, one or more processors, and a memory device storing instructions thereon that when executed by the one or more processors, causes one or more of the one or more processors to: receive a charge request for charging an electrical device or operation powering of the electrical device's duty cycle, wherein the charge request includes time charge block sorting factors; generate a charging and powering schedule that includes one or more multiple sets of disjointed time charge blocks to start and stop drawing power from a power grid to charge the electrical device or power the electrical device's duty cycle, wherein the generated time charge blocks represent when the electrical device is available for operating or load shifting, and wherein the charge request for the electrical device has a leave time or a device-needed time; calculate a cost of electricity drawn during the scheduled time blocks; calculate greenhouse gas emissions created during the scheduled time blocks, wherein each time charge block represents a block of time, a charge price, and a charge emissions value; and sort the time charge blocks in the charging and powering schedule using sorting factors that include price, emissions, solar availability, or combinations thereof.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3A is a logic diagram of a communication and control system showing multiple utilities connecting to multiple manufacturer-specific cloud services without a system and method for generating and implementing an electrical device charging schedule, according to one implementation of the disclosed embodiments.

DETAILED DESCRIPTION

Figure 1A:
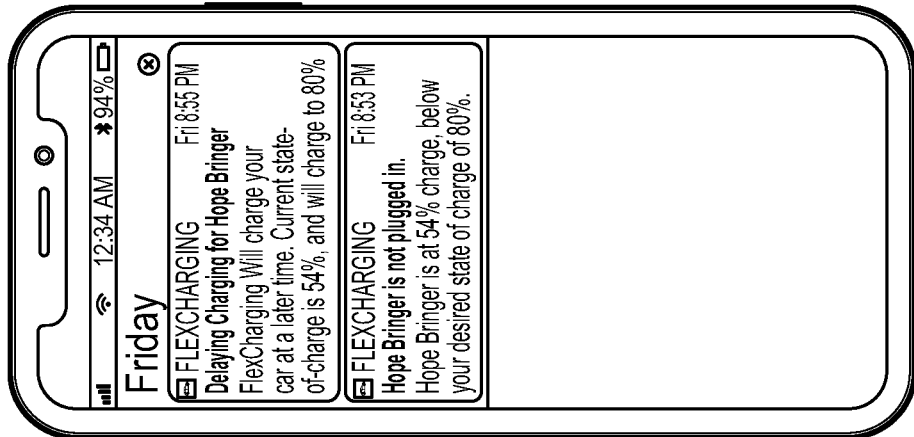
FIG. 1A is a view of a smart charge application on a smart phone for use in a system and method for generating and implementing an electrical device charging schedule, according to one implementation of the disclosed embodiments.
Figure 1A:
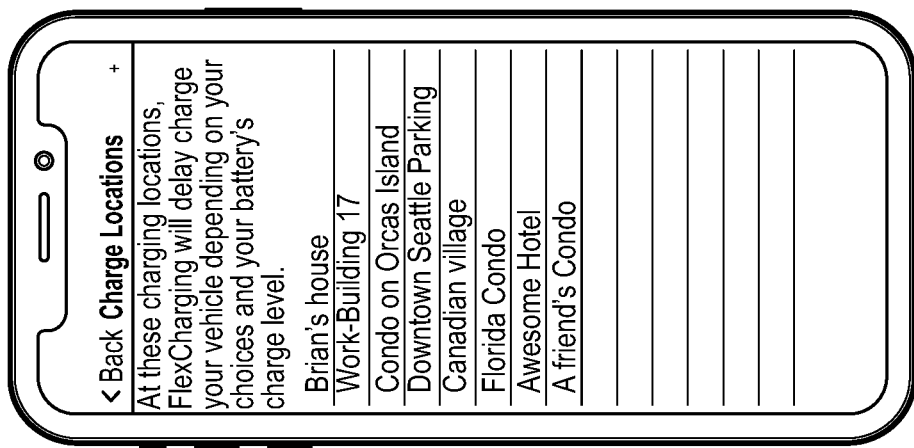
Figure 1A:
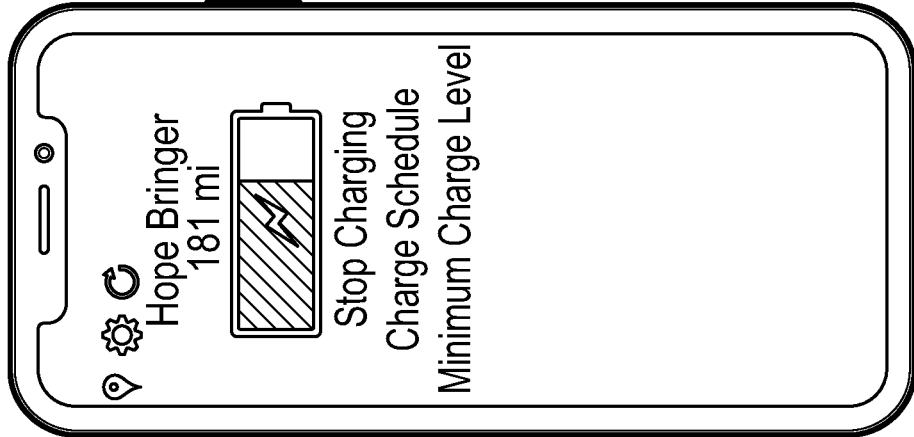
Figure 1B:
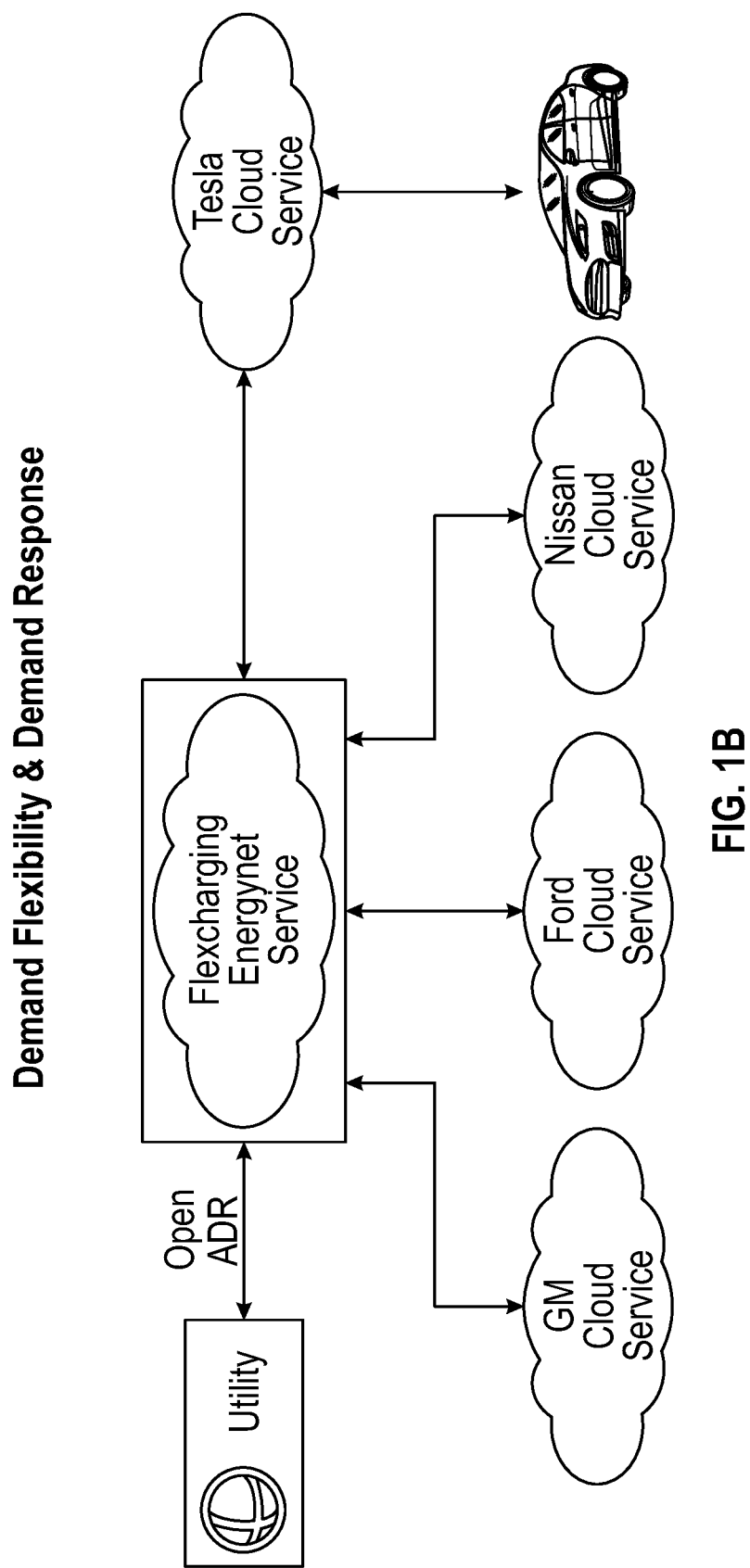
FIG. 1B is a logic diagram of an electric vehicle connecting to a utility through a manufacturer-specific cloud service and the system and method for generating and implementing an electrical device charging schedule, according to one implementation of the disclosed embodiments.
Figure 2A:
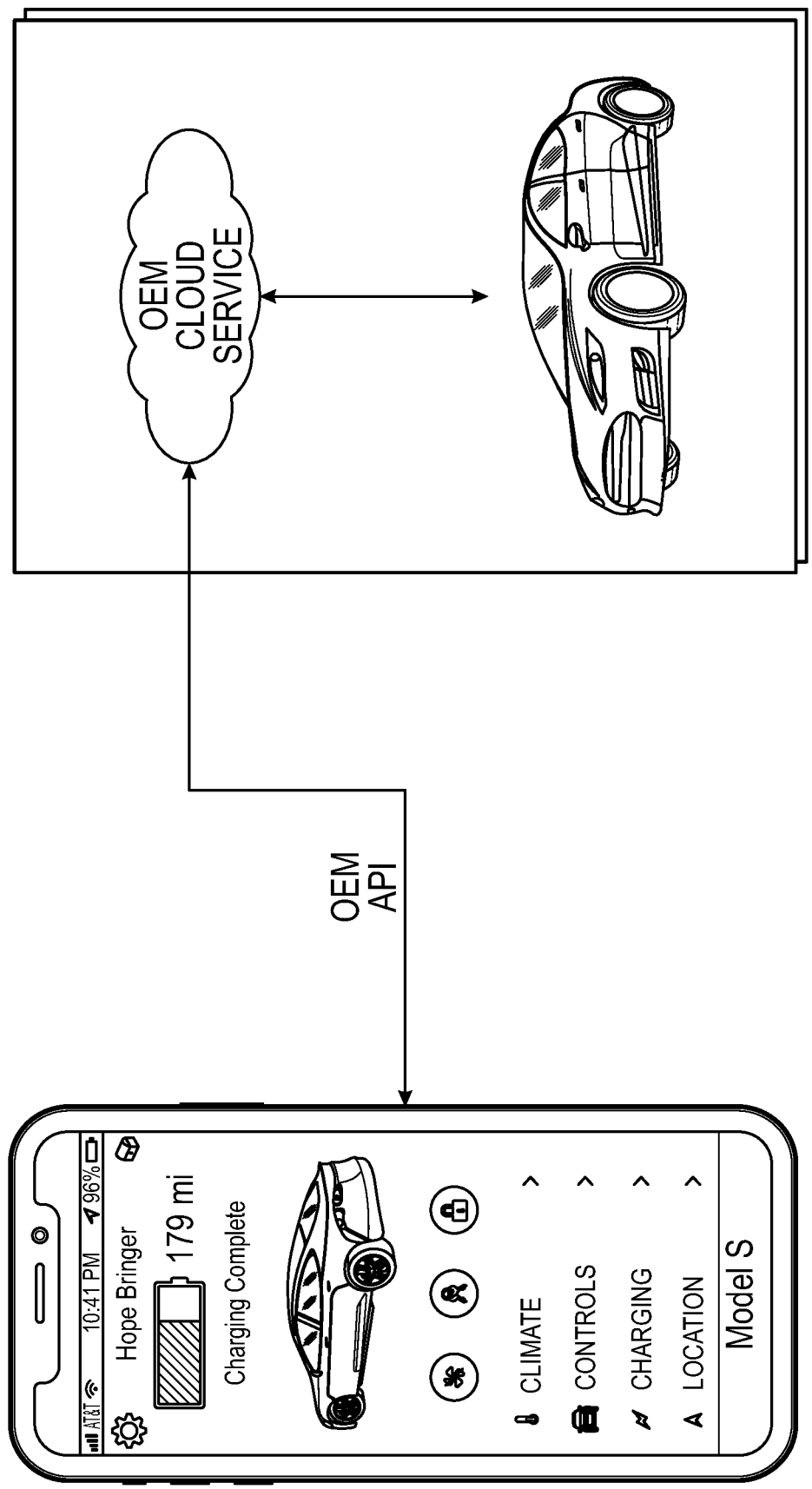
FIG. 2A is a logic diagram of a smart charge application on a smart phone connecting to an electric vehicle in a system and method for generating and implementing an electrical device charging schedule, according to one implementation of the disclosed embodiments.
Figure 2B:
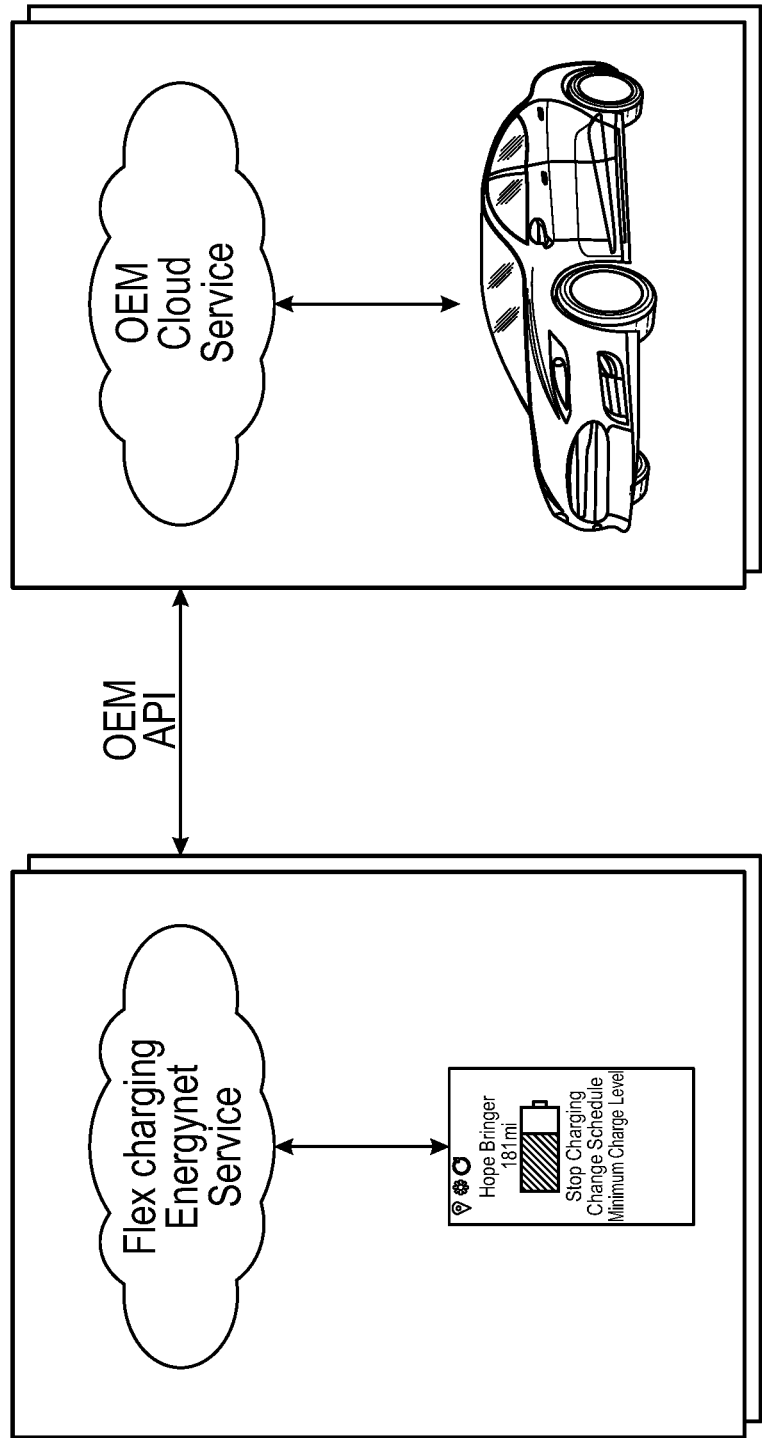
FIG. 2B is a logic diagram of a communication and control system for a smart charge application on a smart phone connecting to a manufacturer-specific cloud service and an electric vehicle in a system and method for generating and implementing an electrical device charging schedule, according to one implementation of the disclosed embodiments.
Figure 3B:
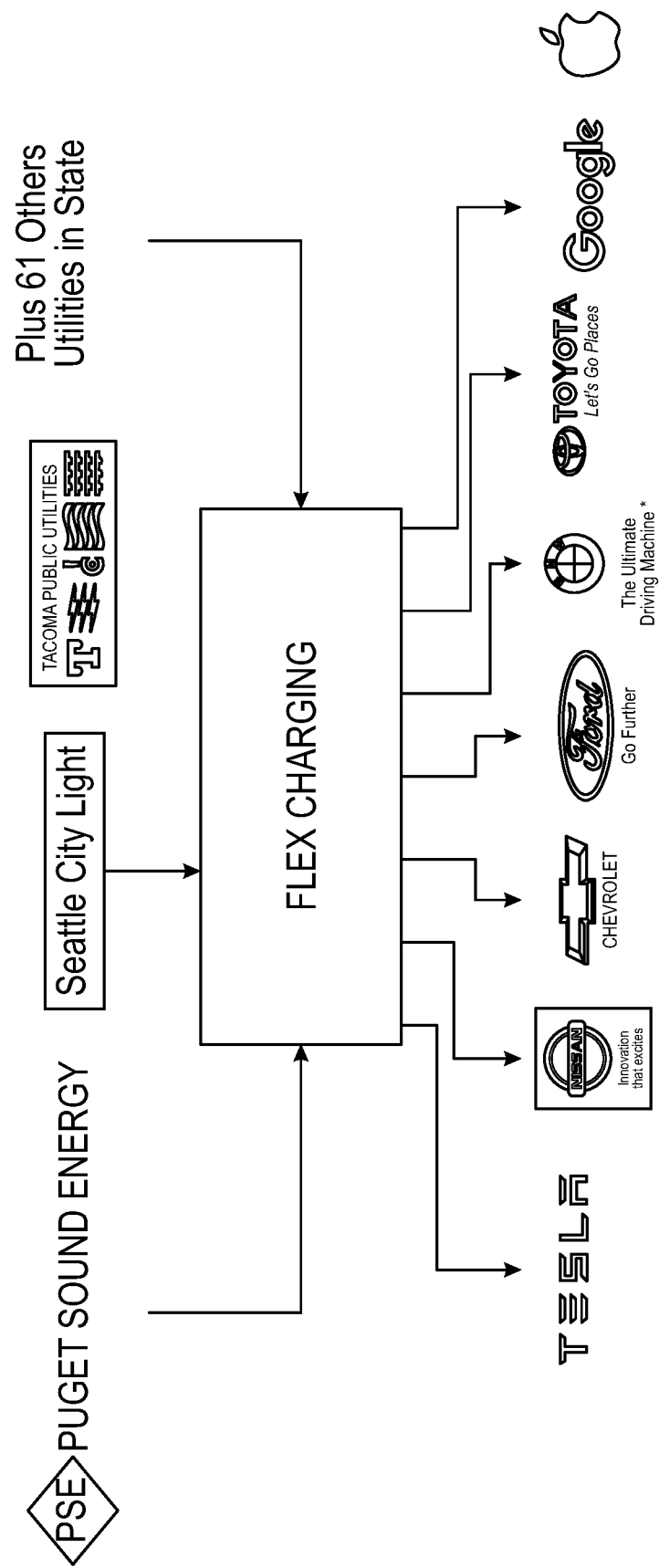
FIG. 3B is a logic diagram of a communication and control system showing multiple utilities connecting to multiple manufacturer-specific cloud services through a system and method for generating and implementing an electrical device charging schedule, according to one implementation of the disclosed embodiments.
Figure 4:
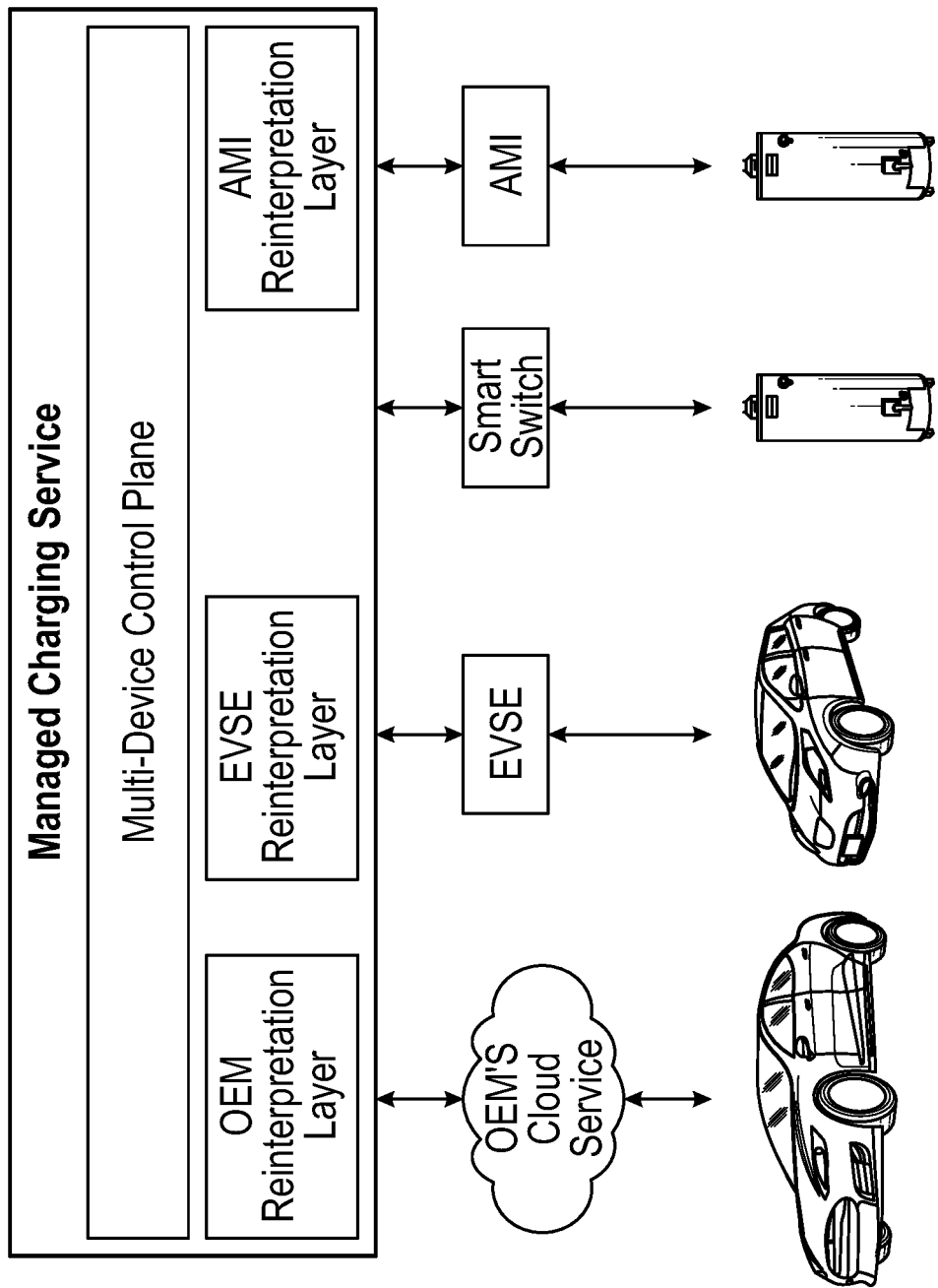
FIG. 4 is a logic diagram of a managed charging service with a multi-device control plane in a system and method for generating and implementing an electrical device charging or operation powering schedule, according to one implementation of the disclosed embodiments.
Figure 5A:
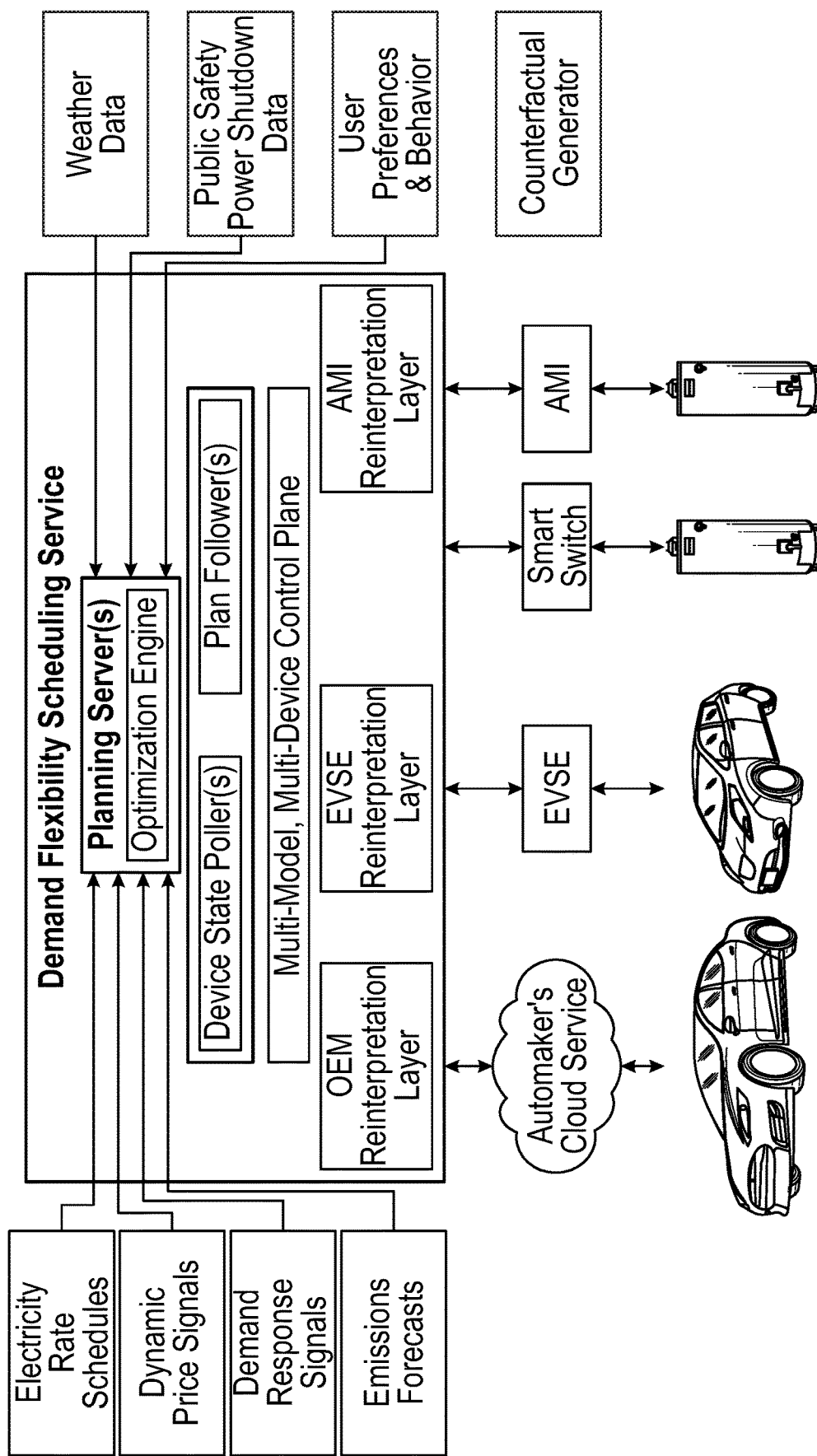
FIG. 5A is a logic diagram of a demand flexibility charging service with a planning server and optimization engine in a system and method for generating and implementing an electrical device charging or operation powering schedule that interfaces with electric vehicles and electric applicants, according to one implementation of the disclosed embodiments.
Figure 5B:
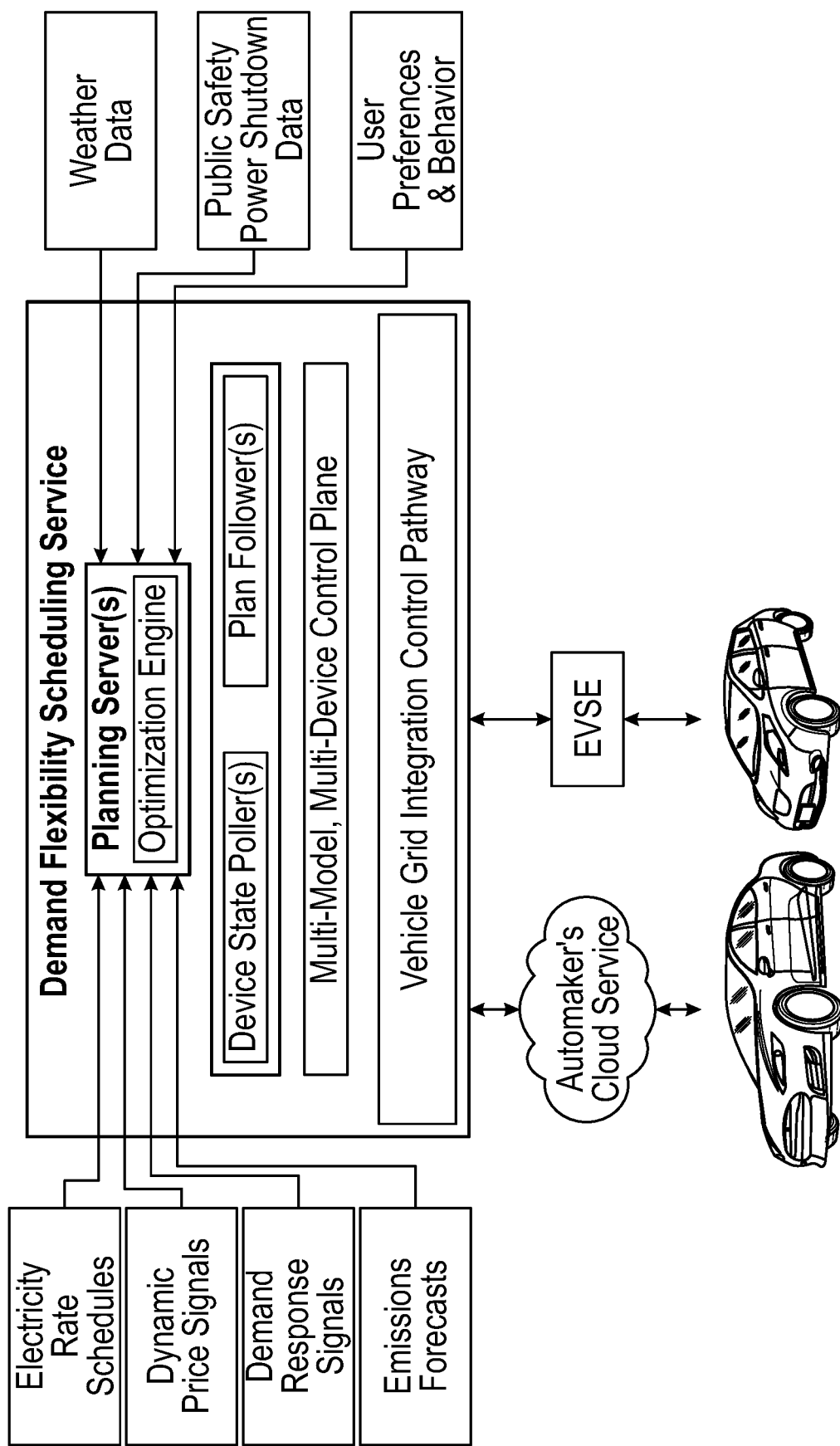
FIG. 5B is a logic diagram of a demand flexibility charging service with a planning server and optimization engine in a system and method for generating and implementing an electrical device charging or operation powering schedule that interfaces with electric vehicles, according to one implementation of the disclosed embodiments.

Persons of ordinary skill in the art will understand that the present disclosure is illustrative only and not in any way limiting. Each of the features and teachings disclosed herein can be utilized separately or in conjunction with other features and teachings to provide a system and method for generating and implementing an electrical device charging or operation powering schedule. Representative examples utilizing many of these additional features and teachings, both separately and in combination, are described in further detail with reference to the attached figures. This detailed description is merely intended to teach a person of skill in the art further details for practicing aspects of the present teachings, and is not intended to limit the scope of the claims. Therefore, combinations of features disclosed in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities, and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

System and Method For Generating and Implementing an Electrical Device Charging or Operation Powering Schedule Referring now to FIGS. 1A-5B, in one or more embodiments of the system and method for generating and implementing an electrical device charging or operation powering schedule, the owner-operator of electric vehicles and/or other electrical devices may set reasonable bounds on when they need the one or more electrical devices to be charged or complete their normal duty cycle. Frequently, an electrical such as a dishwasher is filled after dinner, but the clean dishes aren't needed until the following morning. Similarly, an electric vehicle is driven home after work and does not need to be fully charged until the following morning, depending on the driver's schedule. This long downtime may coincide with low utilization of the electric grid, meaning operating the device in the middle of the night generally leads to lower costs, and in many places, lower emissions from power generation. Nevertheless, care should be taken to respect the owner's charging requirements. For example, in some situations, an owner may need its electric car to maintain a minimum level of charge to ensure it is available for emergencies.

In some situations, utilities may realize lower total costs by aggregating devices from multiple customers and treating them as a general platform. By using the system and method for generating and implementing an electrical device charging or operation powering schedule, a utility or a device aggregator can control many electrical devices whose charging requirements are time-shiftable in a utility's service territory, providing demand flexibility in addition to demand response. This provides a "non-wires alternative" for utilities, so they can meet needs with no construction, no permitting process for running new power lines, avoiding local opposition to power line construction, and the like.

In some embodiments, the system and method for generating and implementing an electrical device charging or operation powering schedule is able to aggregate devices for demand flexibility, while scheduling when the electrical devices should charge (or operate). In another aspect of some embodiments, the system employs an algorithm that reads the current state of the electrical device and decides whether to start or stop charging. The algorithm system and method for generating and implementing an electrical device charging or operation powering schedule is also capable of looking forward several hours or days to build a charging schedule.

In one or more embodiments, a system for generating and implementing an electrical device charging or operation powering schedule includes a planning server, a control mechanism for the electrical devices, a set of registered electrical devices, one or more goals to be implemented, and one or more device state poller systems. In some implementations, the planning server that create charging schedules for electrical devices, either individually or in aggregate for a partitioned area. The planning server may be tied to one or more grid-based partitioned sub-regions for devices, such as all devices in one country, one utility balancing authority, a load aggregation point, a substation, a transformer, or an individual neighborhood feeder. Planning may also be implemented on a microgrid level as well. This partitioning may be performed either within the planning server itself, or by creating independent instances of the planning server. This partitioning scheme may reflect the design of the electric grid within a particular city or region.

In another embodiment of the system for generating and implementing an electrical device charging or operation powering schedule, device-based partitioning may be employed. For scalability purposes, one or more instances of a planning server may be used for the same grid-based partition. This partitioning may be performed based on a vehicle ID, vehicle makes, device types (e.g., hot water heaters and air conditioners in one partition, electric vehicles in another partition), or an arbitrary measure, such as a hash function on a customer identifier (like an email address). In this manner, multiple planning servers are implemented to operate on a set of electric vehicles, due to scalability constraints. In some embodiments, charging and powering schedules may be stored in memory or in a durable storage mechanism, for comparison and auditing over time. Additionally, charging and powering schedules for electric devices may be rescheduled over time as input signals from utilities change, or in response to usage of the device, phantom load, or user input.

In another aspect of one or more embodiments, a system for generating and implementing an electrical device charging or operation powering schedule includes a control mechanism for electrical devices. Such control mechanisms include a multi-modal control plane for demand flexibility and electric vehicle charging.

In still another aspect of one or more embodiments, a system for generating and implementing an electrical device charging or operation powering schedule includes registered devices, along with their usage profiles. In one such example, a hot water heater may present information that states where it is located, what its capacity is, and what its set points are for turning off and on with respect to temperature. It may optionally include information on when its associated homeowners typically wake up. In another such example, an electric vehicle may present information that states its home charging location, and a charging schedule for when the car must be fully charged, and on which days (e.g., charged to 80% on weekdays and 20% on weekends).

In yet another aspect, the system includes a goal or set of goals (along with goal priority) to optimize for certain factors, such as price, emissions, renewable integration with the grid, consuming locally-produced generation (i.e., a "drive on sunlight" mode), minimizing distribution system feeder utilization, or other distribution grid optimization issues. The system may also utilize signals from utilities or other entities about the goals above, such as utility rate schedules, dynamic price forecasts, marginal CO2 emissions forecasts, an average carbon intensity forecast, "clean energy index", or other signals. In still other aspects, the system is configured to receive and process indications of grid problems or unexpected pricing events, such as demand response events or critical peak pricing events. In yet other aspects, the system is configured to receive and process indications of power outage information, which are expressed as either real-time power outage information, projections for power outages based on weather, natural disasters like fires, and public safety power shutoffs. In other aspects of one or more embodiments, the system may further include one or more device state poller systems that retrieve current device states and pass this information along to the planning server. In some aspects, the system may further include one or more plan followers that ensure that one or more devices follow the plans for those devices.

In one or more embodiments, a system for generating and implementing an electrical device charging or operation powering schedule includes a counterfactual generator that produces analysis and reports for hypothetical charge sessions or duty cycles under a different set of parameters using the planning server.

Significantly, the system for generating and implementing an electrical device charging or operation powering schedule has the ability to optimize for different charging optimization styles, and the ability to generate a plan consisting of potentially non-contiguous time blocks, and the method of using the same optimization engine algorithm for counterfactual generation.

Referring now to the planning server of system for generating and implementing an electrical device charging or operation powering schedule, the planning server includes an optimization engine. When sent a request for a plan, in some embodiments, the planning server generates time charge blocks when sent a request for a charging schedule that represent when an electrical device is available for operating and/or flexibly shifting its charging load. In some embodiments, the time charge blocks also represent a time charge ending with a leave time or a "device needed" time. Notably, in one or more embodiments, each time charge block represents a block of time, a charging price, and a charging emissions value. The time charge blocks may then be sorted based on several different time charge sorting factors, including by way of example only, and not by way of limitation: price (including rate schedule, dynamic rate from a utility signal, critical peak prices, or combinations thereof), emissions values, a balance of price and emission values, a price first and then emissions, solar time (e.g., optimizing use of electricity around a location's "solar noon"), and first available time. In some embodiments, these time charge sorting factors are selected by the device operator, and in other embodiments, these time charge sorting factors are chosen by the power utility.

In some embodiments, each of these time charge sorting factors has a further bias in their implementation for regional-specific electric needs. For instance, in California the evening peak may start around 4 pm. If the system is sorting for solar, then the system for generating and implementing an electrical device charging or operation powering schedule may de-prioritize a time of day like 4 pm compared to an equivalent time on the other side of the local solar noon. For example, 7-8 am may be equivalent to 4-5 pm, but to help mitigate evening peak issues, the system may favor the 7 AM block first.

The choice of which time charge sorting factors to use may come from the user, and may be recorded as global or location-specific settings.

In some embodiments, there are many constraints on which time charge blocks should be used. For instance, the following factors may constrain when a device must be available, which includes by way of example only, and not be way of limitation, power outages, disasters that may lead to power outages, such as an arriving storm, hurricane, or fire, demand response events, public safety power shutoffs.

For each of these events, there may be a preparation period (e.g., a time in which we expect power to not be available), and a recovery period (e.g., a time from when the power is first restored to when the grid is fully stable). In one embodiment, a planning server may leave out those time charge blocks before passing them to an optimization engine. In another embodiment, those time blocks may be passed to the optimization engine, but are de-prioritized substantially. The optimization engine attempts to schedule time charge blocks or the device duty cycle in the time that is left. If the system cannot fulfill all charging or duty cycle requirements, then the charging or the duty cycle is executed "opportunistically" within those affected times, if power comes back on or is intermittently available.

In some embodiments, the planning server of the system for generating and implementing an electrical device charging or operation powering schedule records a series of time charge blocks that the optimization engine has produced in a charging and powering schedule. A charging and powering schedule can record multiple distinct, non-contiguous blocks of time for charging or for a device's duty cycle, reflecting differences in prices, emissions, or the presence of grid events. This flexible charging and powering schedule enables a device to draw electricity from a power grid when available capacity is cheapest, cleanest, more available, or simply necessary to protect device availability.

A charging and powering schedule produced by the system for generating and implementing an electrical device charging or operation powering schedule, records how much energy was consumed in each time block. In some embodiments, the charging and powering schedule may be specified per time charge block, or as a plan-level power value for time blocks. Notably, power integrated over time equals energy. The charging and powering schedule can be used for computing prices and emissions values for the plan.

In another aspect of some embodiments, the charging and powering schedule may be cached by the planning server (or the plan followers) to provide some degree of stability to the scheduled device's duty cycle, as well as to reduce computational costs. Further, charging and powering schedules record enough information to determine whether they are still valid. In one embodiment for electric vehicles, this means including the charging power of the vehicle and the expected time charging will finish. This information may be obtained from the electric vehicle as a time remaining to charge, then tracked appropriately based on when the charging and powering schedule says to start charging. The charging power may change due to grid conditions, local heat and sun on the charging cable, car details, or other factors, such as operator changes in the electric vehicle.

The time remaining to charge is affected by the charging power, but also issues like temperature and the electric vehicle's phantom load (i.e., power used by the car's electronics, battery heater, and the like). The charging and powering schedules may include a test to ensure they remain valid, by comparing these inputs like charging power and time remaining versus freshly-obtained values from an electric vehicle. If there is a substantial difference, the charging and powering schedule is no longer valid, and plan followers then contact the planning server for a new charging and powering schedule.

In one or more embodiments, the system for generating and implementing an electrical device charging or operation powering schedule includes a counterfactual plan. Each of the time charge sorting factors used by the optimization engine enables the construction of counterfactual plans. Given a historical charge session or an example of a device's duty cycle, a counterfactual generator can partially reverse the process, going from a charge session to a series of time blocks, and can often infer enough data to request a new charging and powering schedule from the planning server of the system for generating and implementing an electrical device charging or operation powering schedule. For example, the charging power may be sent through as-is, and the end of a charge session or a device plug-out time could be used as the "needed time" for optimization. The planning server can repeat the optimization engine using this different set of time charge blocks, with any other time charge sorting factors, and produce potentially several plans for the same charge session under what-if scenarios.

In some embodiments, the counterfactual plan is used to demonstrate what would have happened with different optimization goals, such as focusing on emissions, dynamic prices, or solar usage. Counterfactual plans may also enable a user to see what would have happened if no optimization was implemented. If the charging and powering schedule corresponds to sorting based on time, this should be equivalent to the situation in which a demand flexibility service did not affect a device. In this manner, counterfactuals enable a demand flexibility service to demonstrate its effectiveness. Counterfactual plans may show whether a new rate schedule provides enough time to charge cars or operate devices, while also reflecting the impact on price and emissions.

In some embodiments of a system for generating and implementing an electrical device charging or operation powering schedule, a driver of an electric vehicle arrives at a charging location (e.g., their home) where they have opted to allow managed charging to take place. The driver typically plugs in their electrical vehicle whenever they arrive home. If their electrical vehicle stops charging due to the charging and powering schedule, the driver is notified about stoppage. Their electrical vehicle will charge at some later time, often overnight, according to the charging and powering schedule.

To implement the charging and powering schedule, a device state poller system must check the electrical vehicle's status regularly, at least while the car is driving and soon after it is parked. In one embodiment, the system polls the electrical vehicle every minute or two while driving, then poll for say 10 minutes after arriving home to see whether the electrical vehicle was plugged in. If the electrical vehicle was not plugged in, a notification may be sent to remind the driver to plug in his electrical vehicle. If the electrical vehicle was plugged in, the planning server starts and implements the charging and powering schedule.

For an electric vehicle that arrives at a charging location that allows managed charging, the device state poller system collect information about the vehicle, such as its state of charge, details about how it is plugged in, and if provided, the vehicle's estimate of how long it needs to charge. These measures are occasionally inaccurate, but can be corrected or ignored via functionality embedded in a multi-modal control plane, which converts vehicle-specific information into a common device-neutral representation. Alternately, data can be provided via an automaker cloud-based data location such as a set of streams in a data lake. For this reason, the device state poller system and plan follower are separate components, as the control pathway may be substantially different from the data pathway.

From here, the device state poller system provides device state information to the planning server to construct a charging and powering schedule. The planning server of the system for generating and implementing an electrical device charging or operation powering schedule also examines many other inputs. These inputs may include, by way of example only, and not by way of limitation: vehicle charging location information, current vehicle state, utility price signals, carbon emissions forecasts, demand response events, weather data, public safety power shutoff information, user schedule, utility distribution grid characteristics, and machine learning to infer user schedule.

Vehicle charging location information may include user-provided charging choice to create a location, options about whether to receive notifications at this location, utility name, and utility rate schedule name. A planning server of the system for generating and implementing an electrical device charging or operation powering schedule may obtain vehicle state-of-charge, desired state-of-charge, whether the car is plugged in, odometer readings, and an estimate of the time remaining to charge, and other operational parameters from the vehicle. Utility price signals may include signals derived from the utility rate schedule, may include a dynamic price forecast provided by the utility, may include critical peak pricing events, and may differ based on enrollment in various utility pilots or programs.

In another aspect, carbon emissions forecasts may come from the utility itself, or a third party that provides CO2 emissions forecasts like WattTime. Carbon emissions forecasts may be either marginal or average emissions. When EV load is <10% of the utility's total load, marginal emissions is the right approach.

Regarding demand response events, utilities may participate in an energy imbalance market, and use protocols like Open Automated Demand Response to coordinate with load aggregators to control many devices affecting substantial load on a regional electric grid. One embodiment of the system for generating and implementing an electrical device charging or operation powering schedule enables an electric vehicle device aggregator to receive OpenADR signals to enumerate available devices then later to increase or decrease load by a proscribed amount.

Referring now to weather data, weather forecasts may help predict future load from devices like hot water heaters, air conditioners, and electric resistance heaters within a home. For electric vehicles, weather conditions may reduce range in the battery or add substantial heating and cooling loads. In this manner, outside temperature and other conditions can provide additional depth to charge planning. Additionally, weather forecasts can serve as indicators of upcoming power outages in a power outage predictor system, such as wind storms or hurricanes. Some energy storage devices may include a storm watch mode to pre-charge when power is available, in preparation for a potential future outage.

In some embodiments, public safety power shutoff information is used by the system for generating and implementing an electrical device charging or operation powering schedule. To reduce the risk of transmission and distribution lines sparking fires, some state utilities have instituted "public safety power shutoffs". These may affect entire cities, or individual feeders within some neighborhoods. Data from utilities on upcoming PSPS events may be factored into the algorithm, as time when a vehicle cannot charge.

In another aspect of some embodiments, a user schedule may be used by the system for generating and implementing an electrical device charging or operation powering schedule to assist with generating the charging and powering schedule. In this regard, knowing by when an electric vehicle must be fully charged at a charging location is useful information for meeting driver expectations of availability. Additionally, if a driver has an emergency minimum range configured, this information should also be factored into the scheduling algorithm as a required "must charge now" behavior. Similarly, a daily minimum commute range would be treated as "must charge today" behavior, before the next vehicle scheduled leave time. Any charging beyond that level can be done at a later date, such as the following day, or clumped together for the weekend.

In some embodiments, the system and method for generating and implementing an electrical device charging and operation powering schedule may also employ utility distribution grid characteristics. The utility distribution grid characteristics may include real-time power levels, as well as capacity limits on individual feeders and/or transformers, and the ability to identify on which feeder a device is located.

In yet other embodiments, the system and method for generating and implementing an electrical device charging and operation powering schedule uses machine learning to infer a user schedule. In such an embodiment, a user has not entered a "needed by" schedule but is allowing managed charging. In this situation, machine learning is employed to determine probabilities of "needed by" times based on the user's past behavior in different locations, different days of the week, and the like.

In one or more embodiments, the planning server of the system and method for generating and implementing an electrical device charging and operation powering schedule integrates all of these signals together to produce a charging and powering schedule. A charging and powering schedule is a computer-readable description of when to start and stop charging or operating depending on whether it is a battery-based device or a device with a duty cycle, such as an air conditioner or hot water heater. In some embodiments, the charging and powering schedule records the details used to formulate the charging and powering schedule, such as the desired state of charge, the charging power, and an estimate on how much charging time remains. These parameters may be validated over time with current vehicle state. If these parameters have diverged, then the charging and powering schedule is formulated.

Generation of Charging and Powering Schedule

In some embodiments, charging and powering schedules are generated by analyzing when an electrical device must complete its duty cycle or be fully charged, combined with operational parameters specifying how long the electrical device must operate to complete its duty cycle or be fully charged. The system calculates time charge blocks, deprioritize or exclude times based on factors that prevent charging (or pull in the time when the device must be charged), sort the time charge blocks based on user-specified time charge sorting factors that influence for the charging location, and select the necessary amount of time charge blocks. In one or more embodiments, the system enables time charge blocks to be sorted using multiple different time charge sorting factors, corresponding to various user-specified charging choices. In another aspect, sorting may be customized for local preferences, such as sorting around a solar noon with a bias towards avoiding the local evening peak time.

For example, in one electric vehicle-based embodiment, the charging and powering schedule may charge between 10 PM and 2 AM, stop for two hours, then start charging again at 4 AM for three hours. The charging and powering schedule represents disjoint times to provide full flexibility to the utility, while enabling better integration of renewables, and providing compliance with demand response events or responding to critical peak prices. This may also simply reduce costs, based on a utility rate schedule, dynamic prices, or to minimize carbon emissions from the utility grid.

Executing Charging and Powering Schedule

In some embodiments, the planning (charge scheduling) server then communicates with a plan follower system to ensure an electrical device complies with the charging and powering schedule. The plan follower system then uses the electrical device to provide demand flexibility to the utility, such as by starting and stopping charging at proscribed times for an energy storage device or electric vehicle, or to alter the duty cycle of a hot water heater, air conditioner, dishwasher, clothes washer or dryer, or other interesting appliance. In some such embodiments, the plan follower system then contacts the electrical device via a multi-modal control plane and issue commands to start or stop charging, or to start or stop its duty cycle at various points in time. In another aspect of some embodiments, some devices accept a programmed charging schedule on a daily basis, such as a command to start a dishwasher at a certain time of night.

Notably, in some embodiments the device state poller system and the plan follower system are incorporated into the same system. In other embodiments, these two systems are separate but share the network connections with the electric devices and/or charge network operators. In other embodiments, the device state poller system and the plan follower system are not incorporated into the same system such that the read and write functions of these system are separated.

In some embodiments, electric vehicle data is obtained by using APIs from a connected electric vehicle. The control pathway used by the plan follower system, may be performed by using APIs from a connected electric vehicle as well. However, in other embodiments automakers provide data (either directly or indirectly) to select customers as streams in a data lake, or in an equivalent cloud storage mechanism. In such embodiments, a device state poller system obtains state information from the data lake stream, then uses a multi-modal control plane to represent those events in a common internal format.

In one or more embodiments, the system and method for generating and implementing an electrical device charging and operation powering schedule also includes a mobile application that may be used to send and receive information, as well as opt out of load management, at least temporarily. Additionally, the system and method for generating and implementing an electrical device charging and operation powering schedule includes a notification system that sends notifications when an electrical device is being managed (i.e., charging or the duty cycle is being shifted in time).

In some embodiments, the plan follower system sends notifications to the electrical device operator's cell phone or tablet device indicating when load shifting is occurring. The notification may provide information such as when the device will operate, when charging will start, and when charging will complete, as well as other confidence-related indicators such as the current state of charge or the current vehicle range.

In another aspect of some embodiments, the device state poller system detects that an electric vehicle has been at home for several minutes, parked but not plugged in, and sends a notification to the operator to plug in the electric vehicle. To properly make use of the system and method for generating and implementing an electrical device charging and operation powering schedule, an electric vehicle should be plugged in whenever the vehicle is home so that the vehicle's battery management system manage the vehicle's state of charge, condition the battery, pre-heat the interior, and other operations. Also, driver availability is best served when a car is fully charged. Similarly, utility demand flexibility is best realized when a device is plugged in for a longer period of time so that it increases options for when shift charging may occur. To help meet these goals, the device state poller system may send a notification to an electric vehicle driver reminding them to plug in their electric vehicle when the vehicle is home. The notification may also include the current state of charge and/or the vehicle's current range.

Adaptive Polling

Some embodiments of the system and method for generating and implementing an electrical device charging and operation powering schedule also implement adaptive polling. In such embodiments, an adaptive polling system is used by the device state poller system to minimize energy usage while also providing a reasonable quality of service. The adaptive polling system computes the next time to poll the device, based on its current state, how long it has been in that state, and other factors (e.g., time of day, user scheduled leave times, the existence of relevant demand response events, natural disasters, and public power safety shutoffs). Without the use of an adaptive polling system, electric devices may be polled so frequently that they use excess energy and bandwidth, or they may be polled so infrequently that they do not provide useful quality of service to a utility.

In one or more embodiments, the adaptive polling system calculates a polling frequency using many frequency adjustment factors that include, by way of example only, and not by way of limitation: Device state, charging power, scheduled demand response event, resources are available for demand response, leave time of the charging device, deep sleep scheduling, public safety power shutoffs, time boundaries, price boundaries, natural disasters, and the like. For an electric vehicle, device states include driving or stationary, length of time driving, length of time stationary, parked, stopped at traffic light, disconnected from a charging unit, connected to a charging unit, charging at a charging unit, not charging at a charging unit.

Regarding the frequency adjustment factor of the charging power of an electric vehicle's charging unit, the calculation made by the system includes whether the electric vehicle is plugged into a standard speed charger or a DC fast charger. Regarding the frequency adjustment factor of whether a device may soon participate in a scheduled demand response event, the calculation made by the system includes the start time of the event, the end time, and a preparation period around both times. The adaptive polling system calculation may also include whether a utility is checking how many resources are available for demand response. Another frequency adjustment factor involves a leave time at which an electric device must be charged to proscribed levels or must have completed its duty cycle. This information may be entered by the user, or computed via a machine learning engine.

In another aspect of the adaptive polling system, a frequency adjustment factor includes analyzing fixed times of day to provide a snapshot of the device state throughout the day to enhance the quality of service provided to utilities. Another frequency adjustment factor includes time boundaries for different prices in a utility rate schedule or dynamic pricing scheme. Still other frequency adjustment factors include information with respect to power outages, deep sleep states of an electrical device (from which the electrical device should not be awoken), any public safety power shutoffs applicable to this device (and the probability that they will affect this device, and any natural disasters (e.g., wind storms, hurricanes, and the like) that may be applicable to the electrical device.

Notably, in some embodiments, the adaptive polling system employs a polling algorithm that minimizes energy consumption. However, in other embodiments, the adaptive polling system employs a polling algorithm that is factored differently based on whether the polling is a substantial load on the electric vehicle or whether it is inconsequential load on the electric vehicle. For example, if a hot water heater is permanently connected via the internet to a server, there may be little need to reduce polling frequency.

Figure 6:
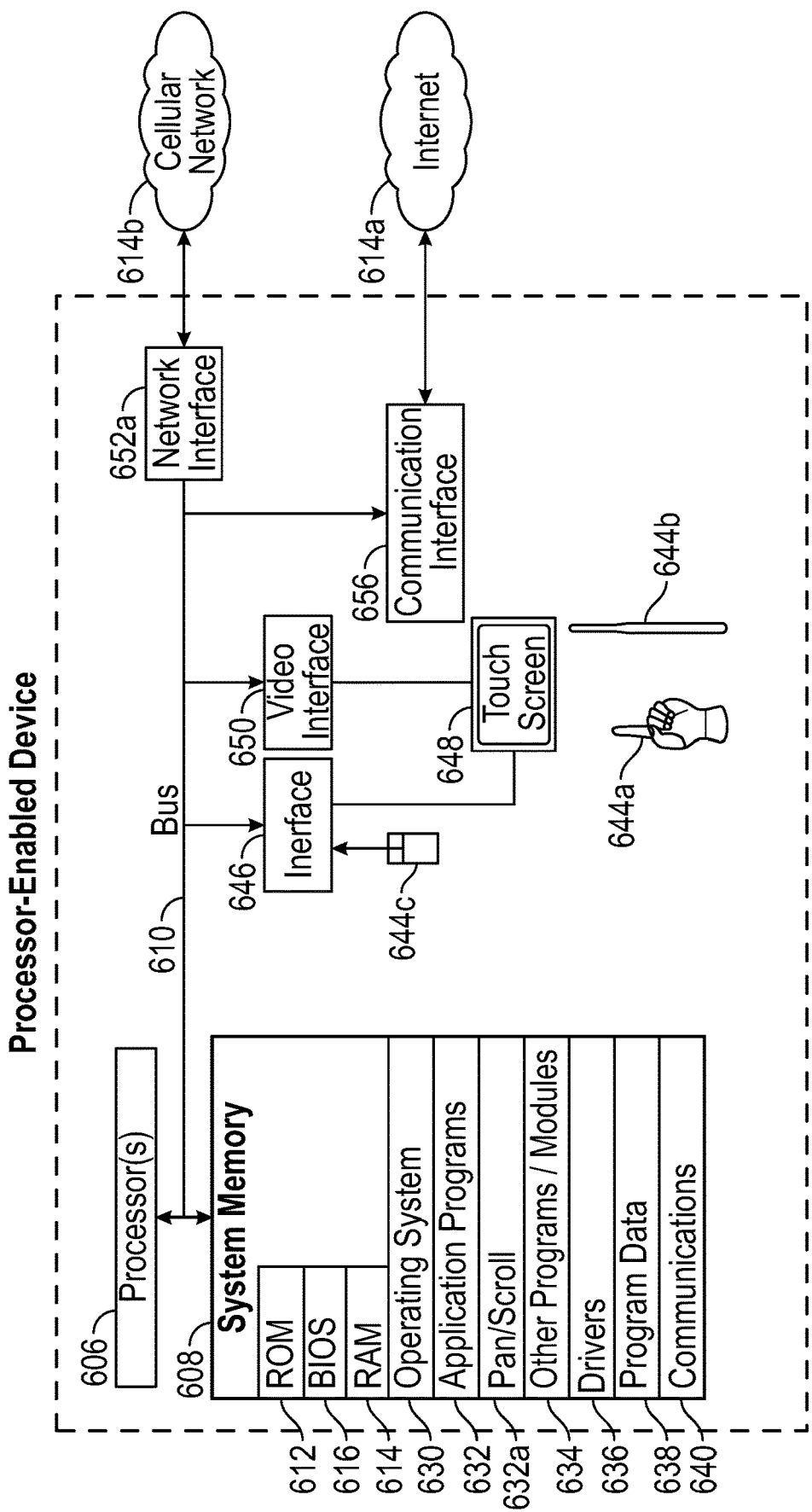
FIG. 6 is a block diagram of an example processor-based device used to implement a system and method for generating and implementing an electrical device charging or operation powering schedule as described herein.

For use in conjunction with the system for generating and implementing an electrical device charging schedule, FIG. 6 shows a processor-based device suitable for implementing the system for generating and implementing an electrical device charging schedule, as well as the processor-based mobile devices that support the applications used in conjunction with the system. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

In the system for generating and implementing an electrical device charging schedule, the processor-based device may, for example, take the form of a smartphone or wearable smart glasses, which includes one or more processors 606, a system memory 608 and a system bus 610 that couples various system components including the system memory 608 to the processor(s) 606. The processor-based device will, at times, be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

The processor(s) 606 in the processor-based devices of the system for generating and implementing an electrical device charging schedule may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 6 are of conventional design. As a result, such blocks need not be described in further detail herein, as they will be understood by those skilled in the relevant art.

The system bus 610 in the processor-based devices of the system for generating and implementing an electrical device charging schedule can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within processor-based device, such as during start-up. Some implementations may employ separate buses for data, instructions and power.

The processor-based device of the system for generating and implementing an electrical device charging schedule may also include one or more solid state memories; for instance, a Flash memory or solid state drive (SSD), which provides nonvolatile storage of computer-readable instructions, data structures, program modules and other data for the processor-based device. Although not depicted, the processor-based device can employ other nontransitory computer- or processor-readable media, for example, a hard disk drive, an optical disk drive, or a memory card media drive.

Program modules in the processor-based devices of the system for generating and implementing an electrical device charging schedule can be stored in the system memory 608, such as an operating system 630, one or more application programs 632, other programs or modules 634, drivers 636 and program data 638.

The application programs 632 may, for example, include panning/scrolling 632*a*. Such panning/scrolling logic may include, but is not limited to, logic that determines when and/or where a pointer (e.g., finger, stylus, cursor) enters a user interface element that includes a region having a central portion and at least one margin. Such panning/scrolling logic may include, but is not limited to, logic that determines a direction and a rate at which at least one element of the user interface element should appear to move, and causes updating of a display to cause the at least one element to appear to move in the determined direction at the determined rate. The panning/scrolling logic 632*a* may, for example, be stored as one or more executable instructions. The panning/scrolling logic 632*a* may include processor and/or machine executable logic or instructions to generate user interface objects using data that characterizes movement of a pointer, for example, data from a touch-sensitive display or from a computer mouse or trackball, or other user interface device.

The system memory 608 in the processor-based devices of the system for generating and implementing an electrical device charging schedule may also include communications programs 640, for example, a server and/or a Web client or browser for permitting the processor-based device to access and exchange data with other systems such as user computing systems, Web sites on the Internet, corporate intranets, or other networks as described below. The communications program 640 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 6 as being stored in the system memory 608, operating system 630, application programs 632, other programs/modules 634, drivers 636, program data 638 and server and/or browser can be stored on any other of a large variety of nontransitory processor-readable media (e.g., hard disk drive, optical disk drive, SSD and/or flash memory).

A user of a processor-based device in the system for generating and implementing an electrical device charging schedule can enter commands and information via a pointer, for example, through input devices such as a touch screen 648 via a finger 644*a*, stylus 644*b*, or via a computer mouse or trackball 644*c* which controls a cursor. Other input devices can include a microphone, joystick, game pad, tablet, scanner, biometric scanning device, and the like. These and other input devices (i.e., "I/O devices") are connected to the processor(s) 606 through an interface 646 such as a touch-screen controller and/or a universal serial bus ("USB") interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648. Although not shown, the processor-based device can include other output devices, such as speakers, vibrator, haptic actuator or haptic engine, and the like.

The processor-based devices of the system for generating and implementing an electrical device charging schedule operate in a networked environment using one or more of the logical connections to communicate with one or more remote computers, servers and/or devices via one or more communications channels, for example, one or more networks 614*a*, 614*b*. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based devices of the system for generating and implementing an electrical device charging schedule may include one or more network, wired or wireless communications interfaces 652*a*, 656 (e.g., network interface controllers, cellular radios, WI-FI radios, Bluetooth radios) for establishing communications over the network, for instance, the Internet 614*a* or cellular network 614*b*.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652*a*, 656 are illustrated as communicably coupled to each other via the system bus 610, thereby providing connectivity between the above-described components. In alternative implementations of the processor-based device, the above-described components may be communicably coupled in a different manner than illustrated in FIG. 6. For example, one or more of the above-described components may be directly coupled to other components, or may be coupled to each other, via intermediary components (not shown). In some implementations, system bus 610 is omitted, and the components are coupled directly to each other using suitable connections.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable and/or wearable electronic devices, not necessarily the exemplary wearable electronic devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system for generating and implementing a computer-readable series of instructions for one or more of starting and stopping electrical device charging or operation powering of an electrical device's duty cycle, the system comprising:
   a planning server including an optimization engine, one or more processors, and a memory device storing instructions thereon that when executed by the one or more processors, causes one or more of the one or more processors to:
      receive a charge request for charging an electrical device or operation powering of the electrical device's duty cycle, wherein the charge request includes time charge block sorting factors;
      generate a charging and powering schedule that includes multiple sets of disjointed time charge blocks to start and stop drawing power from a power grid to charge the electrical device or power the electrical device's duty cycle;
      wherein the generated time charge blocks represent when the electrical device is available for operating or load shifting, and wherein the charge request for the electrical device has a leave time or a device-needed time;
      specify a power level for the electrical device;
      calculate a cost of electricity drawn during the scheduled time blocks;
      calculate greenhouse gas emissions created during the scheduled time blocks, wherein each time charge block represents a block of time, a charge price, and a charge emissions value;

sorting the time charge blocks in the charging and powering schedule using sorting factors that include price, emissions, solar availability, and combinations therein; and implementing the charging and powering schedule for the electrical device using factors that include price, emissions, solar availability, and combinations thereof.

2. The system of claim 1, wherein the time charge block factor of price in sorting the time charge blocks in the charging and powering schedule includes one or more of static price from a rate schedule, dynamic price from a utility signal, and critical peak prices.

3. The system of claim 1, wherein the time charge block factor of emissions values in sorting the time charge blocks in the charging and powering schedule includes one or more of only emissions values, a balance of emissions values and price, and price first and then emissions values.

4. The system of claim 1, wherein the time charge block factor of solar in sorting the time charge blocks in the charging and powering schedule includes one or more of solar availability, optimizing around solar noon, time of day, local sun rise and sun down, and combinations thereof.

5. The system of claim 1, wherein the time charge block factor of solar in sorting the time charge blocks in the charging and powering schedule includes prioritizing a first available time, some prioritizing of a first available time, or no prioritizing of a first available time.

6. The system of claim 1, wherein the charging and powering schedule represents a future device duty cycle or charge session, or may refer to a hypothetical past period that may have happened.

7. The system of claim 1, wherein each time charge block includes a start time and an end time, or a start time and a duration.

8. The system of claim 1, further comprising: one or more of charging and powering schedule implementation systems, wherein the one or more charging and powering schedule implementation systems receives a charging and powering schedule from the planning server and charges the electrical device according to the charging and powering schedule.

9. The system of claim 8, wherein the one or more charging and powering schedule implementation systems employ a multi-modal control plane for one or more of demand flexibility, electric vehicle charging, and obtaining vehicle status.

10. The system of claim 8, wherein the one or more charging and powering schedule implementation systems employ adaptive polling to achieve one or more of minimizing energy drain on the electrical device and reducing cell phone connectivity charges.

11. The system of claim 1, further comprising: one or more device state poller systems that obtains device states on a periodic basis, wherein the device states include one or more of if an electric vehicle is charging, if an electric vehicle is driving, and state of charge of an electric vehicle.

12. The system of claim 1, further comprising: one or more of charging and powering schedule implementation systems that includes one or more device state poller systems.

13. The system of claim 1, further comprising: one or more planning server instances that correspond to one or more of grid-based partition of devices and device-based partition of devices.

14. The system of claim 13, wherein the planning server integrates utility rate schedules, daily electricity price forecasts, supply-demand curves, dynamic pricing signals, user schedule, battery state of charge, and charging speed at a given location.

15. The system of claim 13, wherein the planning server employs a utility grid-based scheduling partitioning scheme for regional balancing authority.

16. The system of claim 13, wherein fleet vehicles are sub-partitioned based on frequent charging locations and are scheduled as a sub-group, to minimize fleet operator demand charges.

17. The system of claim 13, wherein the planning server employs a device partitioning scheme for efficiency and scalability using a unique identifier for all partitioned devices.

18. The system of claim 13, wherein the planning server employs a device partitioning scheme using a hashing geo-fencing combination that routes to a particular instance of the planning server.

19. The system of claim 1, further comprising: a counterfactual generator that uses the planning server to generate alternate hypothetical charging and powering schedules using different optimization sorting factors from the optimization engine.

20. The system of claim 1, wherein the planning server receives a user schedule that is input by a user or generated by monitoring driver behavior over time and using machine learning to produce a user schedule.

21. The system of claim 1, wherein charging locations are specified by a user, obtained from an external data source, manually resolved through labor-intensive processes, or inferred by monitoring user behavior.

22. The system of claim 1, wherein the planning server employs rescheduling factors that include one or more of a driver's emergency minimum range, minimum state of charge requirements, and a minimum daily commute range.

23. The system of claim 22, wherein the driver's emergency minimum range is expressed in one more or a minimum distance to hospital, a minimum distance to a frequent destination, and a minimum battery level.

24. The system of claim 22, wherein one or more of a user's car model, car year, and car specific information are used to determine an optimal minimum state of charge level.

25. The system of claim 1, wherein the planning server integrates dynamic prices power price forecasts for a utility, a regional balancing authority, a load aggregation point, or other subdivision of the power grid.

26. The system of claim 1, wherein the planning server integrates two or more of weather, signals about bad weather events, and natural disaster predictions.

27. The system of claim 1, wherein the planning server integrates projected public safety power shutoffs data.

28. The system of claim 1, wherein the planning server integrates day-ahead and real-time marginal greenhouse gas emissions forecasts.

29. The system of claim 1, wherein the planning server integrates demand response events.

30. The system of claim 1, wherein the planning server produces an optimized solution for both drivers and utilities.

31. The system of claim 1, wherein the planning server generates a charging and powering schedule using factors that include minimizing greenhouse gas emissions, price, peak capacity need, maximize local or regional solar consumption, and localized distribution grid needs.

32. The system of claim 1, wherein the planning server utilizes a user-specified solar usage goal to optimize for local solar consumption to achieve one or more of saving costs, avoiding lost energy from charging and discharging local energy storage too soon, and providing benefits for driving on sunlight.

33. The system of claim 1, wherein the planning server provides a drive-on-sunlight mode to vehicle drivers by shifting charging with respect to solar noon.

34. The system of claim 1, wherein the planning server utilizes a utility-specified solar usage goal to optimize for utility-scale solar generation or wind generation to exploit daily power market price arbitrage opportunities.

35. The system of claim 1, wherein the planning server is configured to minimize utility demand charges at a single location, the single location being selected from a workplace, fleet location, or multi-unit residential dwelling using a regional sub-partitioning scheme.

36. The system of claim 1, further comprising: one or more device state poller systems that sends notifications to the device operator.

37. The system of claim 36, wherein the notifications include a reminder to plug in an electric vehicle if the electric vehicle is at an electric vehicle charging location but not plugged in.

38. The system of claim 36, wherein the notifications include a message to the device operator announcing that charging will be shifted or the duty cycle will be delayed.

39. The system of claim 1, wherein the system employs an adaptive polling mechanism to reduce or increase frequency of waking the electrical device to minimize energy consumption and cell phone connectivity costs while providing a better quality of service around known interesting times.

40. The system of claim 39, wherein the adaptive polling mechanism uses device state, leave times, utility rate schedules, dynamic prices, demand response events, and public safety power shutoffs, and to determine when next to poll the electrical device.

41. The system of claim 1, wherein the planning server schedules electrical devices individually, or in aggregate for an entire partitioned area or sub-area.

42. A system for generating and implementing an electrical device charging schedule, the system comprising:
a planning server including an optimization engine, one or more processors, and a memory device storing instructions thereon that when executed by the one or more processors, causes one or more of the one or more processors to:
receive a charge request for charging an electrical device or operation powering of the electrical device's duty cycle, wherein the charge request includes time charge block sorting factors;
generate a charging and powering schedule that includes one or more multiple sets of disjointed time charge blocks to start and stop drawing power from a power grid to charge the electrical device or power the electrical device's duty cycle;
wherein the generated time charge blocks represent when the electrical device is available for operating or load shifting, and wherein the charge request for the electrical device has a leave time or a device-needed time;
calculate a cost of electricity drawn during the scheduled time blocks;
calculate greenhouse gas emissions created during the scheduled time blocks, wherein each time charge block represents a block of time, a charge price, and a charge emissions value; and
sort the time charge blocks in the charging and powering schedule using sorting factors that include price, emissions, solar availability, and combinations thereof.

43. A method of generating and implementing an electrical device charging schedule, the method comprising:
receiving a charge request for charging an electrical device or operation powering of the electrical device's duty cycle, wherein the charge request includes time charge block sorting factors;
generating a charging and powering schedule that includes one or more multiple sets of disjointed time charge blocks to start and stop drawing power from a power grid to charge the electrical device or power the electrical device's duty cycle, wherein the generated time charge blocks represent when the electrical device is available for operating or load shifting, and wherein the charge request for the electrical device has a leave time or a device-needed time;
specifying a power level for the electrical device;
calculating a cost of electricity drawn during the scheduled time blocks;
calculating greenhouse gas emissions created during the scheduled time blocks,
wherein each time charge block represents a block of time, a charge price, and a charge emissions value;
sorting the time charge blocks in the charging and powering schedule using sorting factors that include price, emissions, solar availability, and combinations therein; and
implementing the charging and powering schedule for the electrical device using factors that include price, emissions, solar availability, and combinations thereof.

* * * * *